United States Patent
Quesnel

[19]

[11] Patent Number: 6,035,175
[45] Date of Patent: Mar. 7, 2000

[54] SINGLE REVOLUTION CLUTCH WITH AUTO-HOMING FEATURE

[75] Inventor: Lisbeth S. Quesnel, Pittsford, N.Y.

[73] Assignee: Xerox Corporation, Stamford, Conn.

[21] Appl. No.: 09/108,733

[22] Filed: Jul. 1, 1998

[51] Int. Cl.[7] .......................... G03G 21/00; F16D 11/06; F16D 11/00
[52] U.S. Cl. ..................... 399/345; 192/415; 192/107 C; 192/109 B
[58] Field of Search ..................................... 399/345, 353, 399/357; 192/41 S, 107 C, 109 B

[56] References Cited

U.S. PATENT DOCUMENTS

| | | | |
|---|---|---|---|
| 3,620,339 | 11/1971 | Becking | 192/107 C X |
| 3,926,286 | 12/1975 | Johnson | 192/41 S |
| 4,227,458 | 10/1980 | Kapoor | 192/41 S X |
| 4,445,596 | 5/1984 | Waters et al. | 192/109 B X |
| 4,791,455 | 12/1988 | Yamamoto et al. | 399/345 |
| 5,583,626 | 12/1996 | Nagaoka | 399/353 |
| 5,669,055 | 9/1997 | Thayer et al. | 399/345 |

Primary Examiner—Fred L. Braun
Attorney, Agent, or Firm—Kevin R. Kepner

[57] ABSTRACT

A single revolution clutch with an auto-home feature. This feature, added to the single revolution clutch, provides a mechanical home position stop. It utilizes the motion of the case to accomplish this. Whenever the clutch is energized, the case is pulled in, or the 1 mm gap is closed. The control ring has an additional single home detent on the opposite side to the one or more detents normally found on the single revolution clutch. The case has a tab feature, which can be punched out of the case itself, or can be tacked on as an additional piece of metal or plastic. This tab feature, seen as an "L" shape from the side, will move with the case. When the case is energized and closes its 1 mm gap, the normal detents on both the control ring and the case, spin free of each other. However, the "L" tab now moves closer to the single home tab on the other side of the control ring, and locks the control ring within one revolution of rotation or less. In this manner, the home position of the shaft is automatically located. When the case is released when the clutch is de-energized, the case moves out and the control ring rotates until the nearest detent locks with the normal detent on the case. The clutch continues operation in the normal manner, ie. pulsing periodically to move to the next shaft position, and so on.

15 Claims, 4 Drawing Sheets

SINGLE REVOLUTION CLUTCH WITH AUTO-HOMING FEATURE

This invention relates generally to a clutch device for an electrophotographic printing machine and, more particularly, concerns a single revolution clutch having an auto-home position feature.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

The foregoing generally describes a typical black and white electrophotographic printing machine. With the advent of multicolor electrophotography, it is desirable to use an architecture which comprises a plurality of image forming stations. One example of the plural image forming station architecture utilizes an image-on-image (IOI) system in which the photoreceptive member is recharged, reimaged and developed for each color separation. This charging, imaging, developing and recharging, reimaging and developing, all followed by transfer to paper, is done in a single revolution of the photoreceptor in so-called single pass machines, while multipass architectures form each color separation with a single charge, image and develop, with separate transfer operations for each color.

In multi-pass color machines it is generally necessary to move certain subsystem components, such as a cleaning device, into and out of contact with the photoreceptive member during the print cycle. It is desireable to be able to accomplish this movement with a relatively simple and inexpensive device. One such way is to use a linkage driven by a cam which has several operating positions within one complete revolution. This type of system requires the ability to accurately locate the cam position about its revolution. Additionally, after a machine shut down or a jam situation, the machine controller must be able to accurately reposition the cam to a start or "home" position.

In accordance with one aspect of the present invention, there is provided a. An indexing clutch having an auto home position feature comprising an input member, an output member, an engagement device to selectively connect said input member and said output member, a control member, said control member having an indexing protrusion that is engageable by said engagement device, an actuator to selectively engage said engagement member and a locator for mechanically positioning said control member in a home position after disengagement of said engagement device.

In accordance with another aspect of the invention there is provided a device having an indexing drive including a clutch, comprising an input member, an output member, an engagement device to selectively connect said input member and said output member, a control member, said control member having an indexing protrusion that is engageable by said engagement device, an actuator to selectively engage said engagement member and a locator for mechanically positioning said control member in a home position after disengagement of said engagement device.

In accordance with yet another aspect of the invention there is provided an electrophotographic printing machine having a cleaning device that is selectively disengageable from a photoreceptive member, comprising, a cylindrical cleaning brush, an elongated member rotatably supporting said cylindrical cleaning brush at one end thereof, a follower member, located on the opposite end of said elongated member; said elongated member being pivotably mounted between said cleaning brush and said follower member, a cam rotatably supported wherein said follower member is biased against said cam so that rotation of said cam causes said cleaning brush to be selectably contacted with and removed from a photoreceptive member and a drive system including an indexing clutch for driving said cam.

Other features of the present invention will become apparent as the following description proceeds and upon reference to the drawings, in which.

This invention relates to an imaging system which is used to produce color output in multiple passes of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a single pass color process system, a single or multiple pass highlight color system and a black and white printing system. Likewise the device herein has application in any situation in which a single revolution clutch may be employed and for which it is desireable for the clutch to return to a known home position.

Figure 1:
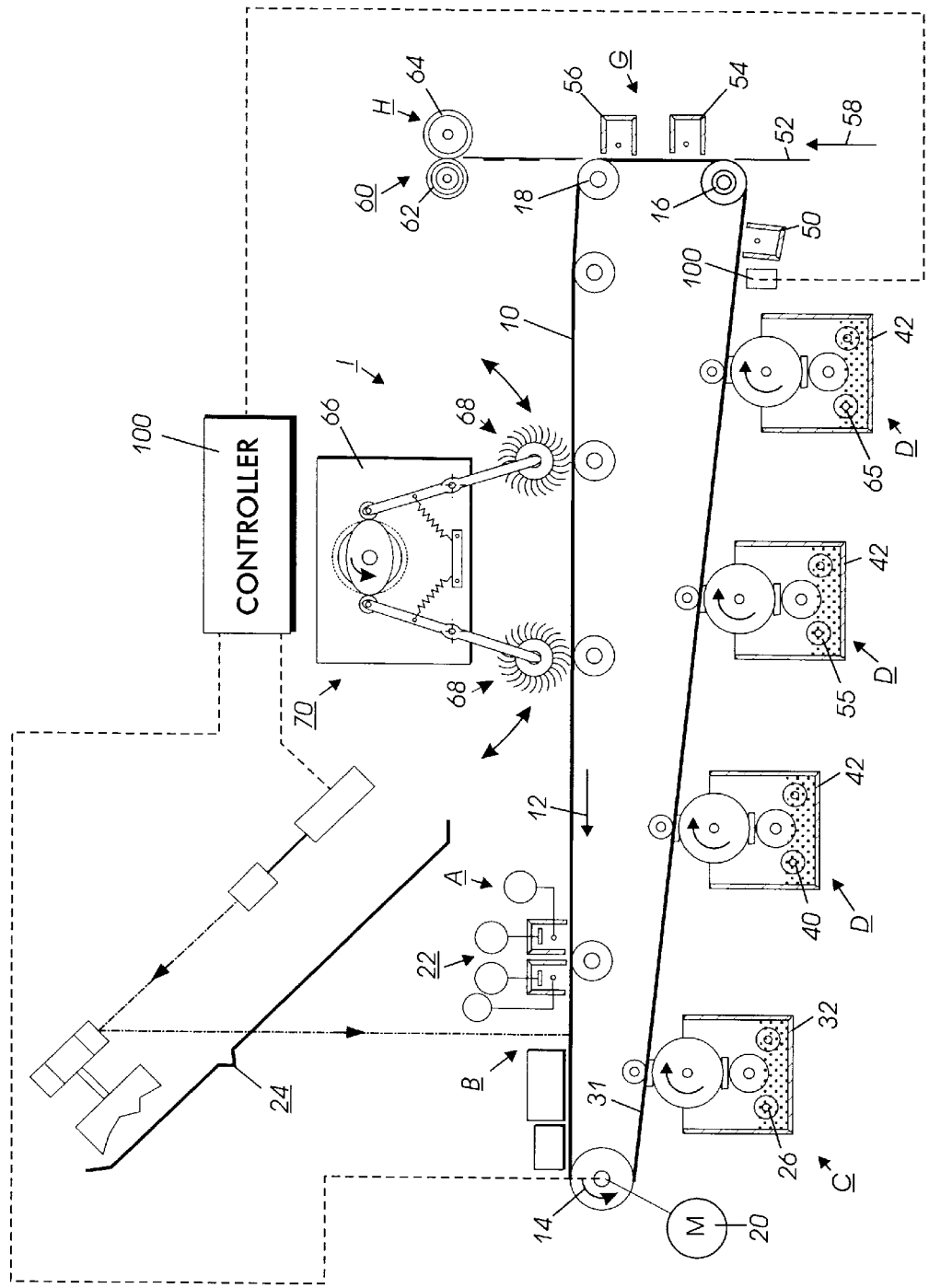
FIG. 1 is a schematic elevational view of a full color image-on-image multi-pass electrophotographic printing machine utilizing the device described herein.

Turning now to FIG. 1, the printing machine of the present invention uses a charge retentive surface in the form of an Active Matrix (AMAT) photoreceptor belt 10 supported for movement in the direction indicated by arrow 12, for advancing sequentially through the various xerographic process stations. The belt is entrained about a drive roller 14, tension rollers 16 and fixed roller 18 and the roller 14 is operatively connected to a drive motor 20 for effecting movement of the belt through the xerographic stations.

With continued reference to FIG. 1, a portion of belt 10 passes through charging station A where a corona generating device, indicated generally by the reference numeral 22, charges the photoconductive surface of belt 10 to a relatively high, substantially uniform, preferably negative potential.

Next, the charged portion of photoconductive surface is advanced through an imaging/exposure station B. At imaging/exposure station B, a controller, indicated generally by reference numeral 100, receives the image signals representing the desired output image and processes these signals to convert them to the various color separations of the image which is transmitted to a laser based output scanning device 24 which causes the charge retentive surface to be discharged in accordance with the output from the scanning device. Preferably the scanning device is a laser Raster Output Scanner (ROS). Alternatively, the ROS could be replaced by other xerographic exposure devices such as LED arrays.

The photoreceptor, which is initially charged to a voltage $V_0$, undergoes dark decay to a level $V_{ddp}$ equal to about −500 volts. When exposed at the exposure station B it is discharged to $V_{expose}$ equal to about −50 volts. Thus after exposure, the photoreceptor contains a monopolar voltage profile of high and low voltages, the former corresponding to charged areas and the latter corresponding to discharged or background areas.

At a first development station C, developer structure, indicated generally by the reference numeral 32 utilizing a hybrid jumping development (HJD) system, the development roll, better known as the donor roll, is powered by two development fields (potentials across an air gap). The first field is the ac jumping field which is used for toner cloud generation. The second field is the dc development field which is used to control the amount of developed toner mass on the photoreceptor. The toner cloud causes charged toner particles 26 to be attracted to the electrostatic latent image. Appropriate developer biasing is accomplished via a power supply. This type of system is a noncontact type in which only toner particles (black, for example) are attracted to the latent image and there is no mechanical contact between the photoreceptor and a toner delivery device to disturb a previously developed, but unfixed, image.

The developed but unfixed image is then transported back to charging device 22 the photoreceptor is recharged to a predetermined level.

A second exposure/imaging is performed by device 24 which comprises a laser based output structure is utilized for selectively discharging the photoreceptor on toned areas and/or bare areas, pursuant to the image to be developed with the second color toner. At this point, the photoreceptor contains toned and untoned areas at relatively high voltage levels and toned and untoned areas at relatively low voltage levels. These low voltage areas represent image areas which are developed using discharged area development (DAD). To this end, a negatively charged, developer material 40 comprising color toner is employed. The toner, which by way of example may be yellow, is contained in a developer housing structure 42 disposed at a second developer station D and is presented to the latent images on the photoreceptor by way of a second HSD developer system. A power supply (not shown) serves to electrically bias the developer structure to a level effective to develop the discharged image areas with negatively charged yellow toner particles 40.

The above procedure is repeated for a third image for a third suitable color toner such as magenta and for a fourth image and suitable color toner such as cyan. The exposure control scheme described below may be utilized for these subsequent imaging steps. In this manner a full color composite toner image is developed on the photoreceptor belt.

To the extent to which some toner charge is totally neutralized, or the polarity reversed, thereby causing the composite image developed on the photoreceptor to consist of both positive and negative toner, a negative pre-transfer dicorotron member 50 is provided to condition the toner for effective transfer to a substrate using positive corona discharge.

Subsequent to image development a sheet of support material 52 is moved into contact with the toner images at transfer station G. The sheet of support material is advanced to transfer station G by conventional sheet feeding apparatus, not shown. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station G.

Transfer station G includes a transfer dicorotron 54 which sprays positive ions onto the backside of sheet 52. This attracts the negatively charged toner powder images from the belt 10 to sheet 52. A detack dicorotron 56 is provided for facilitating stripping of the sheets from the belt 10.

After transfer, the sheet continues to move, in the direction of arrow 58, onto a conveyor (not shown) which advances the sheet to fusing station H. Fusing station H includes a fuser assembly, indicated generally by the reference numeral 60, which permanently affixes the transferred powder image to sheet 52. Preferably, fuser assembly 60 comprises a heated fuser roller 62 and a backup or pressure roller 64. Sheet 52 passes between fuser roller 62 and backup roller 64 with the toner powder image contacting fuser roller 62. In this manner, the toner powder images are permanently affixed to sheet 52. After fusing, a chute, not shown, guides the advancing sheets 52 to a catch tray, not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station I using a cleaning brush or plural brush structure contained in a housing 66. The cleaning brush 68 or brushes 68 are engaged after the composite toner image is transferred to a sheet. Once the photoreceptor is cleaned the brushes are retracted utilizing a device 70 incorporating a clutch of the type described below for the next imaging and development cycle.

It is believed that the foregoing description is sufficient for the purposes of the present application to illustrate the general operation of a color printing machine.

Figure 2:
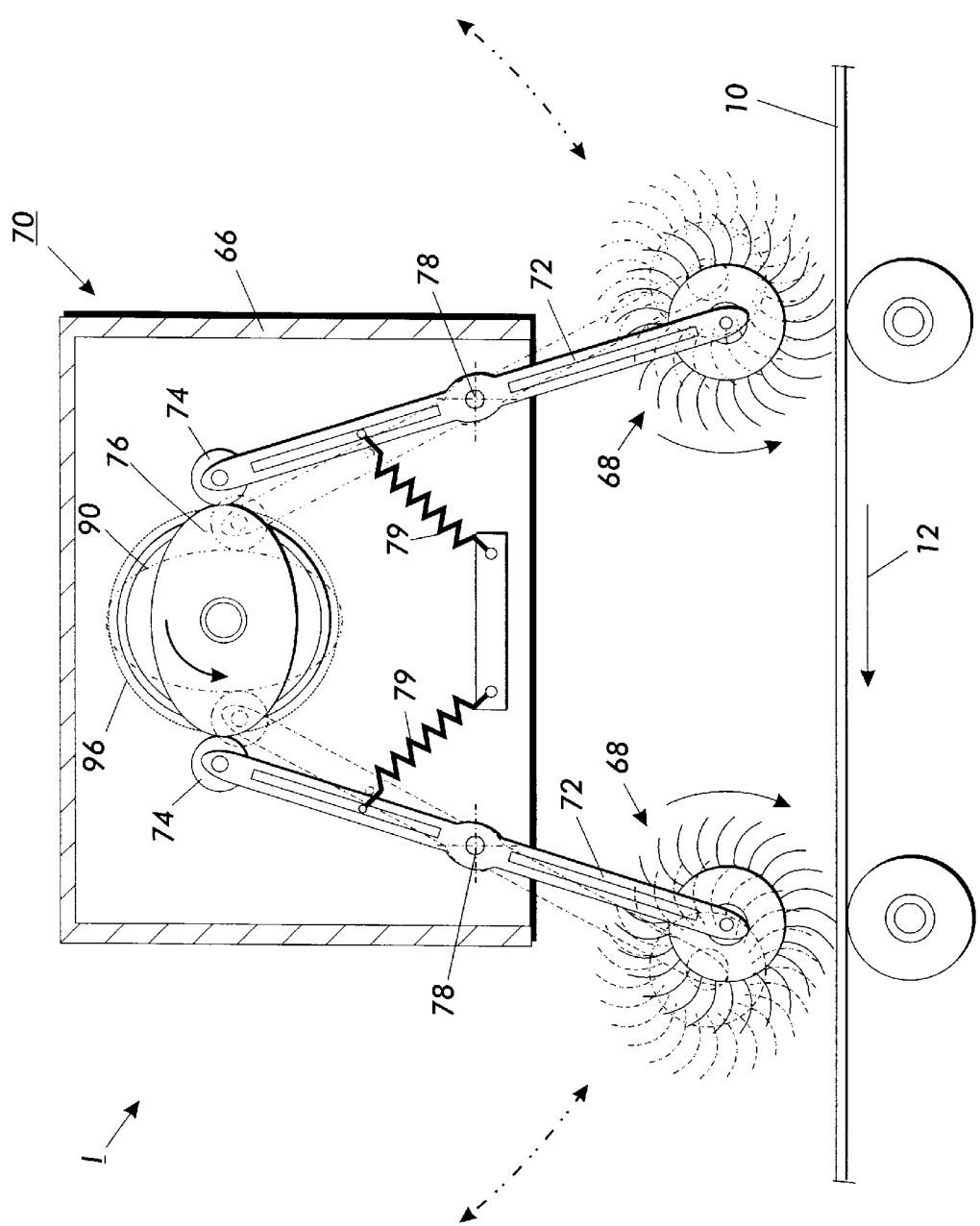
FIG. 2 is a side view illustrating the application of the clutch as utilized in a cleaning system.

As shown in FIG. 2, the cleaning station includes housing 66 which contains the cleaning brushes 68 which retraction is operated by a linkage and clutch device generally referred to as reference numeral 70. The generally cylindrical brushes are rotatably driven by conventional drives not shown. The linkage and clutch includes links 72 attached to brushes 68 at one end and having a follower 74 contacting a cam 76 at the opposite end. The links are pivotally mounted 78 at a point between the follower and the brush ends. As the cam 76 is rotated through a portion of a revolution the links are biased by springs 79 or other biasing members against the cam 76 and cause the brushes 68 to engage and disengage from the surface of the photoreceptor 10. It is important to know the position of the cam and the drive for the cam to effectuate the cleaning cycle at the proper point in the print process.

As is discussed below, it is necessary to be able to control the position of the cleaning brushes in a accurate manner while using a mechanism that will achieve the cost targets for a particular product. Thus, the use of expensive servo motors or other elaborate control devices and sensors is not a practical solution for these devices.

There are several types of shaft rotation. One is a constantly rotating shaft, one that rotates whenever a motor is powered. A second controlled type of rotation is an on/off.

This is controlled by a clutch that when powered up, activates and deactivates the shaft rotation. The stopping position of the shaft, however, is variable. A third type of controlled rotation is activating and stopping a shaft at repeatable times and/or places. The most expensive way to accomplish this is with a stepper motor and encoder. A less expensive way is to use a "smart" clutch. In any case, the home position must be detected in order to determine where and when to stop the shaft rotation.

One example of a "smart" clutch is currently marketed by Reel Precision and employs a series of permanent magnets positioned at the outer circumference of the clutch. They can physically place up to 12 magnets, although in practicality, it is fewer because the fields overlap and interfere with each other. In any event, one of these magnets is a north pole, with the remainder being south poles. Due to the Hall effect (which causes the direction of electron rotation to change based on the magnetic pole), the charge level of the north pole will be opposite to that of the multiple south poles. As the shaft and the magnets rotate cyclically, the north pole and the south poles, can be detected. In this manner, the position of the shaft is determined. The north pole is the home position. However, this clutch has several problems. The primary one of concern is that, after the detection of the home magnet, when the shaft is powered down, the shaft does not stop at a repeatable position. That is because although the home and other positions are detected, the shaft is left to coast to its stopping position. The stopping position is determined by frictional torque in the system. This physical quantity will and does vary over time. As toner emissions and other airborne dirt within a printing machine accumulates on linkages and mechanisms, the stopping time and position of the shaft varies. The torque load varies over time due to wear of parts, also. This stopping position variation is a major problem because all linkage and cam systems are trigonometric in behavior. This means that stopping position accuracy for precision location, is often not more than plus and minus a few degrees in shaft rotation. An alternative for accurate stopping position is a single revolution clutch.

Figure 3:
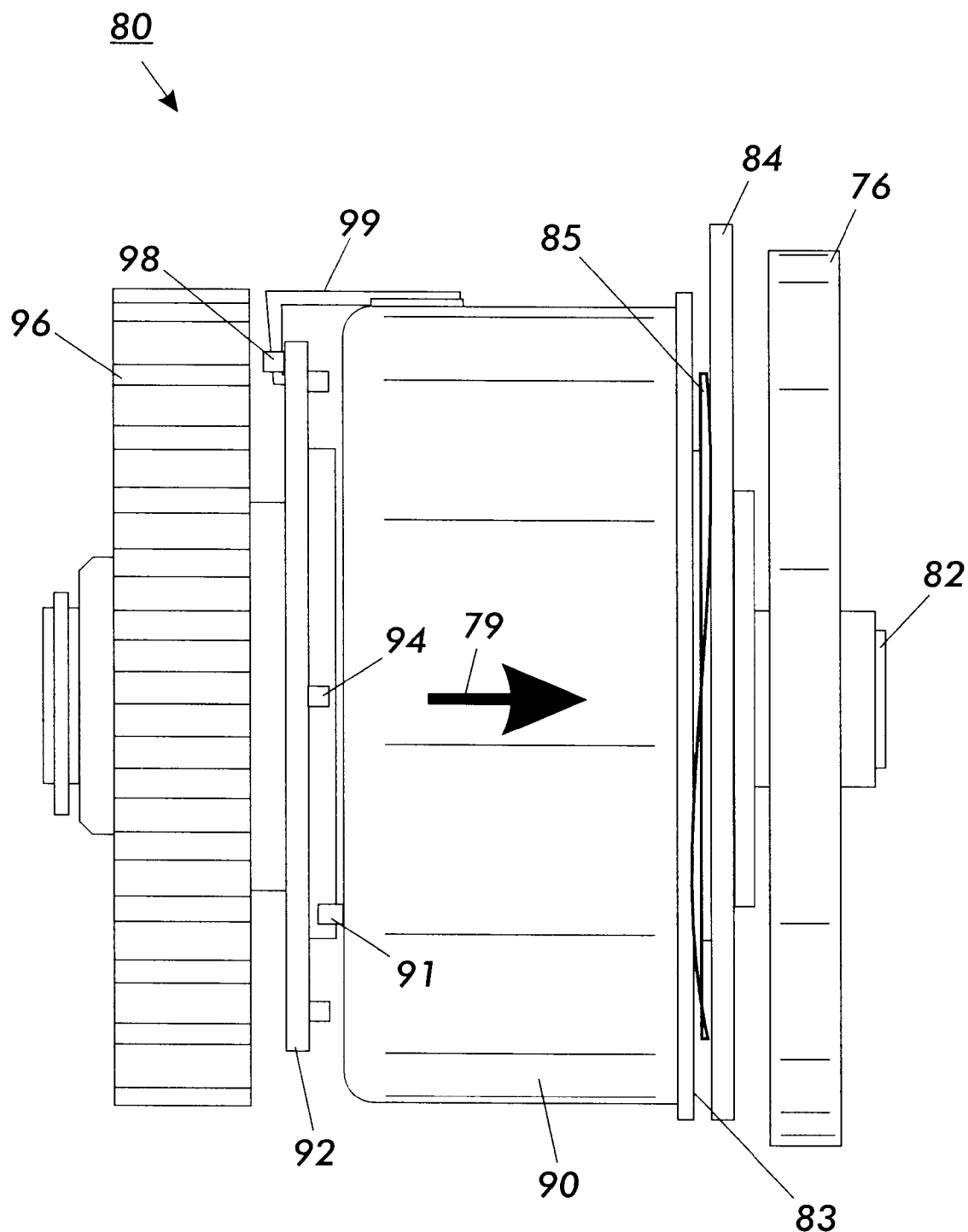
FIG. 3 is a detailed elevational side view of the clutch device.
Figure 4:
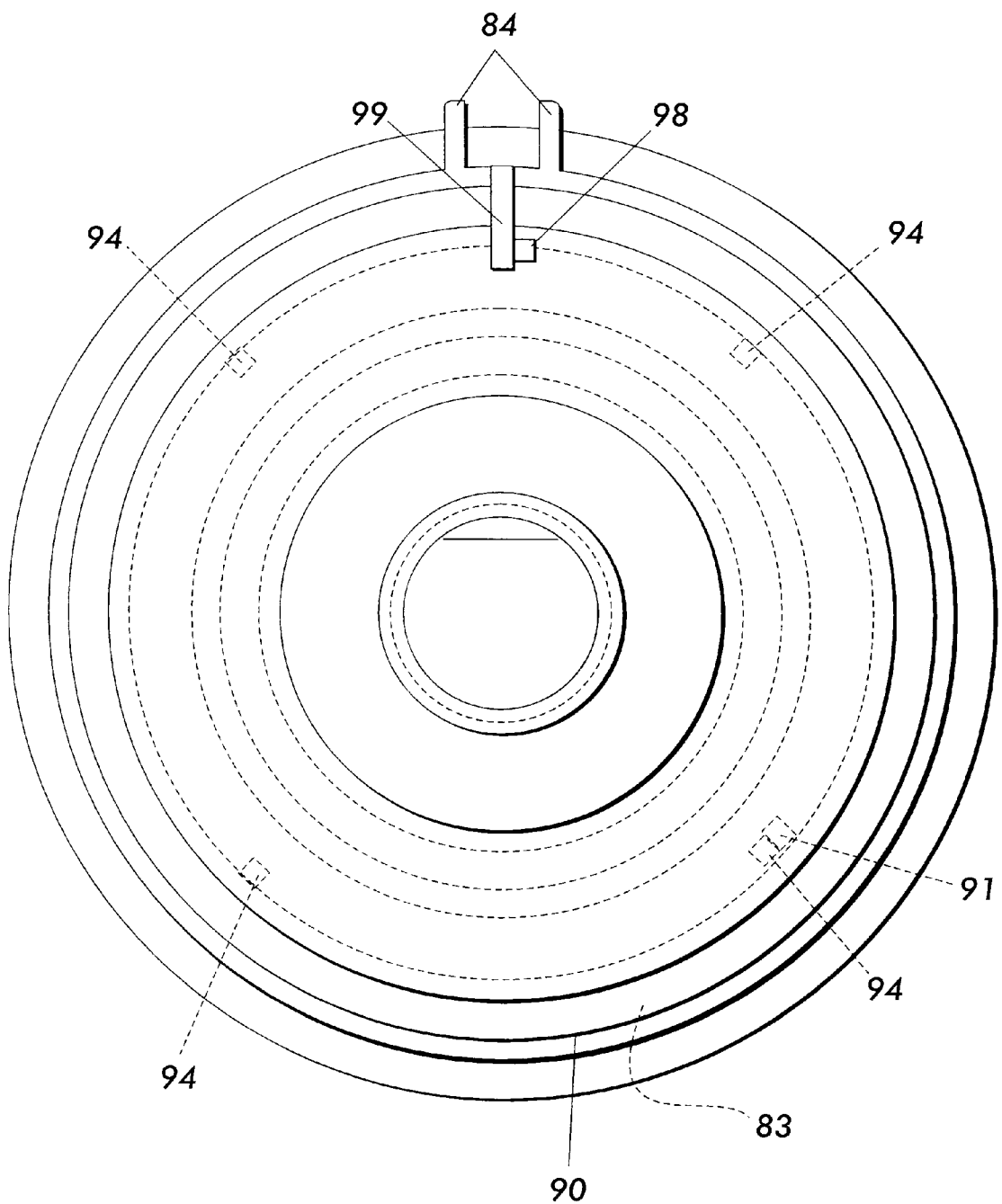
FIG. 4 is a detailed elevational end view of the clutch device.

As shown in FIGS. 3 and 4, single revolution clutch 80 such as that developed by Warner Electric has the appearance of a regular electromagnetic clutch. This enables the clutch 80 to be mounted easily in the standard fashion, that is, a shaft 82 locates the clutch 80, and an anti-rotation bracket 84 prevents the clutch body 90 from spinning around. Unlike standard electromagnetic clutches (where the input can be either the gear or the shaft, and likewise for the output), the input member is always the integral gear 96 and the output member is always the shaft 82. The way the single revolution clutch works is that the external metal 90 case of the clutch pulls to the back plate 83 in the direction of arrow 79 when the voltage is applied. The spacing, of approximately 1 mm, is closed at that point. When the power is off, a wavy spring 85 located between the case 90 and the back plate 83, returns the case 90 to its open 1 mm position. The control ring 92, with one or more detents 94, is located at the opposite side of the case 90 from the back plate 83. The control ring 92 is free to rotate, being driven by the input gear 96, whenever the clutch case 90 is pulled tight to the back plate 83. This is because the case has one protruding detent 91 which will lock with any of the one or more detents 94 on the control ring 92 when the case 90 is in the released or out position. When the control ring 92 is stopped by the mating detent 91 on the clutch case 90, the shaft 82 is also stopped. When it is necessary to move the shaft 82 to the next angular position, the clutch 80 is momentarily engaged. The length of time or number of milliseconds depends on shaft RPM and degrees of rotation to next shaft stopping position. In this manner, a single revolution clutch mechanically stops a shaft at fixed positions.

Several improvements have been made to this clutch such as antibacklash or rebound features, to ensure an accurate stopping position without bouncing the shaft. However, one feature that has been lacking is the "smart" clutch feature, the North pole magnet. Although the single revolution clutches can stop a shaft at fixed points, the clutch still does not know where home is. The only way around this problem has been to add a sensor to the system. This sensor would detect the home position of the shaft and that information would then have to be used to control the single revolution clutch. An ideal clutch would combine the best features of the both clutches, eg. a clutch with mechanical stops, combined with a self-detectable home position.

As further shown in FIGS. 3 and 4 the improvement described illustrates a single revolution clutch with one such solution, which is inexpensive, and with significantly reduced software complexity such as been required with the smart clutch. This feature, added to the single revolution clutch, provides a mechanical home position stop. It utilizes the motion of the engagement device or case 90 to accomplish this. Whenever the clutch is energized, the case is pulled in, or the 1 mm gap is closed. The control ring 92 has an additional single home detent 98 on the opposite side to the one or more detents 94 normally found on the single revolution clutch. The case has a tab or locator feature 99, which can be punched out of the case itself, or can be tacked on as an additional piece of metal or plastic. This tab feature 99, seen as an "L" shape from the side, will move with the case 90. When the case is energized and closes its 1 mm gap, the normal detents 94 on both the control ring 92 and the case 90, spin free of each other. However, the "L" tab 99 now moves closer to the single home tab 98 on the other side of the control ring 92, and locks the control ring 92 within one revolution of rotation or less. In this manner, the home position of the shaft 82 is automatically located. When the case 90 is released when the clutch is de-energized, the case 90 moves out and the control ring 92 rotates until the nearest detent locks 94 with the normal detent 91 on the case 90. The clutch continues operation in the normal manner, ie. pulsing periodically to move to the next shaft position, and so on. The home position is only needed at machine start up, beginning of a run if the shaft needs to be homed, or after a jam to home again. The normal detents 94 are then used for the majority of the time. Whenever home needs to be accessed, the clutch is engaged for at least one revolution. There is only one tab for home. There are one or more tabs for the normal single revolution clutch positions.

The value of this auto-homing feature is that it provides a mechanical home position, can rapidly home a shaft, and does not involve complicated software or a sensor. It allows home to be accessed only when needed. It is also relatively simple and low cost, adding approximately 10–20 cents to the cost of the standard single revolution clutch. With this feature, the single revolution clutch can provide strong competition for the smart clutch.

The invention herein has been illustrated in use with a cleaning device, however it is readily apparent that it is useable in any device for which an accurate position indicator about a rotating cycle is required such as sheet drive systems, dual decurler actuators or the like.

In recapitulation, there is provided a single revolution clutch with an auto-home feature. This feature, added to the single revolution clutch, provides a mechanical home position stop. It utilizes the motion of the case to accomplish this. Whenever the clutch is energized, the case is pulled in, or the 1 mm gap is closed. The control ring has an additional single home detent on the opposite side to the one or more detents normally found on the single revolution clutch. The case has a tab feature, which can be punched out of the case itself, or can be tacked on as an additional piece of metal or plastic. This tab feature, seen as an "L" shape from the side, will move with the case. When the case is energized and closes its 1 mm gap, the normal detents on both the control ring and the case, spin free of each other. However, the "L" tab now moves closer to the single home tab on the other side of the control ring, and locks the control ring within one revolution of rotation or less. In this manner, the home position of the shaft is automatically located. When the case is released when the clutch is de-energized, the case moves out and the control ring rotates until the nearest detent locks with the normal detent on the case. The clutch continues operation in the normal manner, ie. pulsing periodically to move to the next shaft position, and so on.

It is, therefore, apparent that there has been provided in accordance with the present invention, a single rotation clutch with an auto-home feature that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An indexing clutch having an auto home position feature comprising:
   an input member;
   an output member;
   an engagement device to selectively connect said input member and said output member;
   a control member, said control member having an indexing protrusion located thereon that is engageable by said engagement device, and a home indexing protrusion located thereon on a side opposite said indexing protrusion, wherein said home indexing protrusion is engaged upon disengagement of said engagement device to position said output member at a desired location;
   an actuator to selectively engage said engagement device;
   a locator for mechanically positioning said control member in a home position after disengagement of said engagement device.

2. A clutch according to claim 1 further comprising a plurality of indexing protrusions located on said control member.

3. A clutch according to claim 1 wherein said input member comprises:
   a gear; and
   a shaft attached to said gear.

4. A clutch according to claim 1 wherein said engagement device comprises:
   a backing member;
   an electromagnet; and
   a ferromagnetic body adjacent said electromagnet, wherein upon actuation of said actuator said electromagnet causes said ferromagnetic body to be drawn toward said backing member.

5. A clutch according to claim 4 further comprising a biasing member located between said backing member and said ferromagnetic body to return the body to a disengaged position upon disactuating of said actuator.

6. A device having an indexing drive including a clutch, comprising:
   an input member;
   an output member;
   an engagement device to selectively connect said input member and said output member;
   a control member, said control member having an indexing protrusion located thereon that is engageable by said engagement device, and a home indexing protrusion located thereon on a side opposite said indexing protrusion, wherein said home indexing protrusion is engaged upon disengagement of said engagement device to position said output member at a desired location;
   an actuator to selectively engage said engagement device;
   a locator for mechanically positioning said control member in a home position after disengagement of said engagement device.

7. A clutch according to claim 6 further comprising a plurality of indexing protrusions located on said control member.

8. A clutch according to claim 6 wherein said input member comprises:
   a gear; and
   a shaft attached to said gear.

9. A clutch according to claim 6 wherein said engagement device comprises:
   a backing member;
   an electromagnet; and
   a ferromagnetic body adjacent said electromagnet, wherein upon actuation of said actuator said electromagnet causes said ferromagnetic body to be drawn toward said backing member.

10. A clutch according to claim 9 further comprising a biasing member located between said backing member and said ferromagnetic body to return the body to a disengaged position upon disactuating of said actuator.

11. An electrophotographic printing machine having a cleaning device that is selectively disengageable from a photoreceptive member, comprising:
    a cylindrical cleaning brush;
    an elongated member rotatably supporting said cylindrical cleaning brush at one end thereof;
    a follower member, located on the opposite end of said elongated member; said elongated member being pivotably mounted between said cleaning brush and said follower member;
    a cam rotatably supported wherein said follower member is biased against said cam so that rotation of said cam causes said cleaning brush to be selectably contacted with and removed from a photoreceptive member;
    a drive system including an indexing clutch for driving said cam, wherein said drive system comprises:
       an input member;
       an output member;
       an engagement device to selectively connect said input member and said output member;
       a control member, said control member having an indexing protrusion located thereon that is engageable by said engagement device, and a home indexing protrusion located thereon on a side opposite said indexing protrusion, wherein said home indexing protrusion is engaged upon disengagement of said engagement device to position said output member at a desired location;

an actuator to selectively engage said engagement device;

a locator for mechanically positioning said control member in a home position after disengagement of said engagement device.

12. A printing machine according to claim 11 further comprising a plurality of indexing protrusions located on said control member.

13. A printing machine according to claim 11 wherein said input member comprises:

a gear; and a shaft attached to said gear.

14. A printing machine according to claim 11 wherein said engagement device comprises:

a backing member;

an electromagnet; and a ferromagnetic body adjacent said electromagnet, wherein upon actuation of said actuator said electromagnet causes said ferromagnetic body to be drawn toward said backing member.

15. A printing machine according to claim 14 further comprising a biasing member located between said backing member and said ferromagnetic body to return the body to a disengaged position upon disactuating of said actuator.

\* \* \* \* \*